United States Patent [19]

Kondo

[11] 4,371,773
[45] Feb. 1, 1983

[54] STUD WELDING DEVICE

[75] Inventor: Yoshiteru Kondo, Toyohashi, Japan

[73] Assignee: USM Corporation, Farmington, Conn.

[21] Appl. No.: 249,376

[22] Filed: Mar. 31, 1981

Related U.S. Application Data

[63] Continuation of Ser. No. 54,707, Jul. 5, 1979, abandoned.

[51] Int. Cl.³ ............................................... B23K 9/20
[52] U.S. Cl. ...................................................... 219/98
[58] Field of Search ..................... 219/99, 127, 137.41, 219/137.42, 98

[56] References Cited

U.S. PATENT DOCUMENTS 3,408,472 10/1968 Spisak .................................... 219/98
3,641,310 2/1972 Wilson ............................ 219/127 X
3,940,588 2/1976 Oehry .
4,063,059 12/1977 Brolund .

FOREIGN PATENT DOCUMENTS 2212209 7/1974 France .
44-270538 10/1969 Japan .

Primary Examiner—Elliot A. Goldberg
Attorney, Agent, or Firm—Aubrey C. Brine

[57] ABSTRACT

A stud welding device having a collet for holding a stud to be welded, is provided with a guide member which positions the stud on a stepped surface, as in the window frames of automobiles.

3 Claims, 3 Drawing Figures

STUD WELDING DEVICE

This is a continuation of application Ser. No. 054,707, filed July 5, 1979 now abandoned.

BACKGROUND OF THE INVENTION

The present invention relates to a stud welding device, and more particularly, to a welding guide used in such a welding device for determining a welding position.

For example, stud welding is used where studs for mounting window moldings on an automobile are welded onto the window frames. In such a case, the window frame comprises substantially vertical walls spaced from each other, and a substantially horizontal wall between the vertical walls to form a sidewardly directed substantially Z-shaped section. There is, therefore, a problem of interference between the vertical rearward wall and a shield or guide of a welding gun, such that a stud can be welded only at a certain distance from the vertical rearward wall. Furthermore, a narrower window frame is required for making automobiles in the smaller sizes. However, this cannot be accomplished, considering the above limitation of the stud welding position.

It is an object of the present invention, therefore, to provide a stud welding device having a welding guide by which studs can be welded at a position close to the walls of a stepped work piece or base metal, and an atmosphere of shield gas can be formed.

SUMMARY OF THE INVENTION

The present invention provides a stud welding device comprising a collet adapted to hold at its tip a stud to be welded and a welding guide disposed around said collet, characterized in that said welding guide is of a sectional shape having a cut-off at one side adjacent to its one end, said guide being provided at the side of said cut-off with a cover wall at a position close to said collet, and a guide surface for determining a welding position being formed on at least one of said cover wall and the side wall of said welding guide opposite to said cover wall.

In accordance with the stud welding device of the present invention, the cut-off side of the welding guide is positioned at a location in which it is faced against the vertical wall of a base metal so that a stud can be welded at a position close to the vertical wall. If the base metal is of sidewardly directed Z-shaped section positioned as described hereinbefore, the welding guide may include a guide surface formed thereon at the side wall opposite to the cover wall. By engaging this guide surface with the vertical, downwardly directed wall, the welding guide can be properly positioned. If the base metal has simply an L-shaped section, a guide surface is formed on the guide merely at the side of the cover wall. Similarly, the welding guide can be exactly positioned by engaging the guide surface with the vertical, downwardly directed wall of the base metal.

It is convenient in operation that the welding guide be rotatably mounted on the body of welding device. Furthermore, if a flexible skirt is mounted on the end portion of the welding guide, a preferred result can be obtained from the fact that shield gas may be held within a welding area. If the cover wall is disposed at a position close to the periphery of the collet, there is a danger of electric discharge from the periphery of the collet. In order to eliminate this danger, the collet may be covered and insulated by a plastic tube or the like.

BRIEF DESCRIPTION OF THE DRAWINGS

For a complete understanding of the invention, reference should be made to the following description of a preferred embodiment taken with reference to the accompanying drawings, wherein.

DESCRIPTION OF A PREFERRED EMBODIMENT

The present invention will now be described by way of example with reference to the preferred embodiments thereof illustrated in the accompanying drawings.

Figure 1:
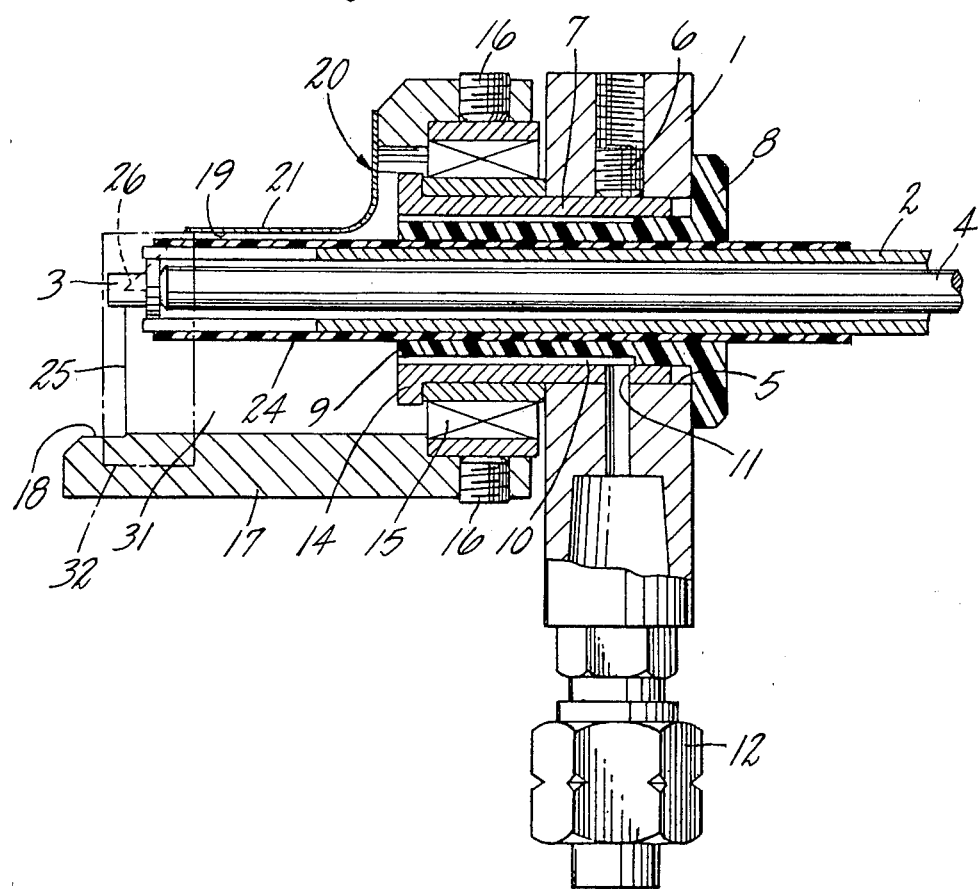
FIG. 1 is a cross-sectional view showing a welding guide constructed in accordance with the present invention.
Figure 2:
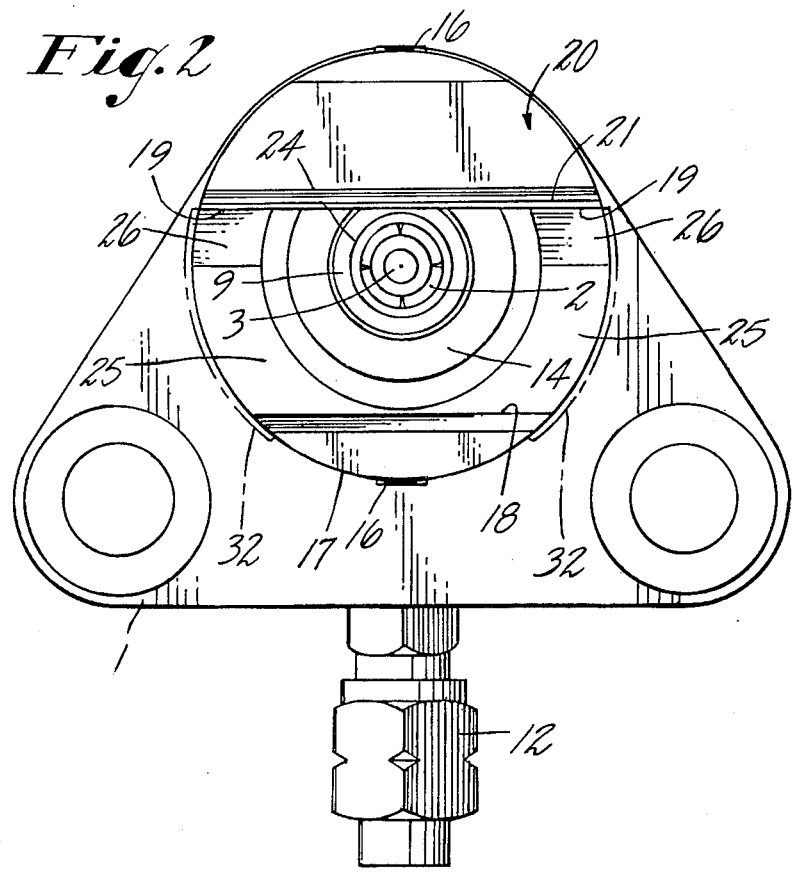
FIG. 2 is an end view of the structure shown in FIG. 1.

Referring to FIGS. 1 and 2, a collet 2, which is mounted on a body of a welding device (not shown), extends forwardly through a holder 1 which is similarly mounted the body. A stud 3, to be welded, is loaded in the tip of the collet 2. As is well known in the art, the stud can be pushed to its loaded position by a piston 4.

Within a bore 5 of the holder 1 through which the collet 2 extends, a pipe spindle is secured at one end by means of a screw 6, and an insulating seal 8 is disposed between the pipe spindle and the collet. The insulating seal 8 includes a reduced portion 9 which has an outer periphery spaced away from the inner periphery of the pipe spindle 7 to form an annular passage 10 therebetween. The annular passage 10 communicates with a gas nipple 12 on the holder 1 through an opening 11 which is formed on the side wall of the pipe spindle 7. The gas nipple 12 may be connected with a source of shield gas (not shown). Thus, the insulating seal 8 serves to feed the shield gas uniformly through the passage 10 into a welding space described hereinafter, while preventing any leakage between the pipe spindle 7 and the collet 2.

An outwardly directed flange 14 is provided at the opposite end of the pipe spindle 7, and bearing assembly 15 is disposed between the flange 14 and holder 1. A cylindrical welding guide 17 is mounted on the bearing 15 by means of screws 16 and rotatably supported by the same bearing assembly 15. In the illustrated embodiment, the welding guide 17 is rotatably supported on the pipe spindle 7, but such an arrangement is not necessarily adopted in accordance with the technical concept of the present invention. However, the rotatable welding guide 17 provides an advantage in that it can be accommodated to various welding positions.

At the other end opposite to the end supported by the bearing, the welding guide 17 is cut-away with two steps along two chords in its circular cross-section as shown in the illustrated embodiment. The first cut-away provides a first flat positioning surface 18 on the inner side wall of the welding guide 17. The side wall of the welding guide 17, which is provided with the first positioning surface 18, is shown to extend forwardly as viewed in FIG. 1. This structure will be described hereinafter.

The second cut-away provides two flat surfaces 19 extending across the wall of the welding guide between which surfaces there is an opening of the welding guide. This opening is closed by means of a cover wall plate 20 which is mounted on the welding guide 17 by any suitable means. The plate 20 has an L-shaped cross-section the longer leg of which serves as a second flat positioning surface 21. As seen from the drawings, the collet 2 is positioned close to the cover wall plate 20 so that there may be any electric discharge therebetween. In order to prevent such an electric discharge, the collet 2 is covered around its outer periphery by an insulator 24 such as a plastic tube or the like. Moreover, there is an escape 26 on a portion of the end surface 25 of the welding guide 17 which connects the first and second positioning surfaces 18 and 21, with each other. This escape 26 will be described hereinafter.

Figure 3:
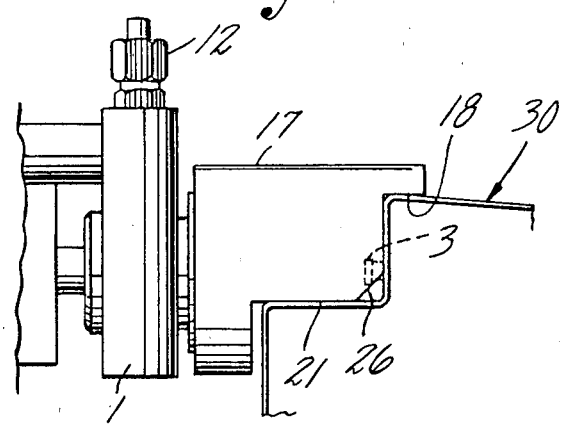
FIG. 3 is a schematic side view showing an operation of the welding guide, according to the present invention.

The welding guide 17 now described is used to weld a stud 3 onto a base metal 30 which has a Z-shaped cross-section positioned on its one side as shown in FIG. 3. The welding guide 17 is positioned by engaging the positioning surfaces 18 and 21 with the surfaces of the two-stepped base metal 30 so that the stud 3 will be properly positioned on the substantially horizontal surface between the above surfaces of the base metal.

As described hereinbefore, the welding guide 17 is provided with the escape 26 which avoids an interference of the guide with any corner on the base metal 30 as shown in FIG. 3. If desired, the escape can be eliminated. The welding position into which the shield gas is supplied from the source through the gas nipple 12, the opening 11 and the annular passage 10. If there is too much leakage between the base metal and the end face of the welding guide or through the escape 26, a flexible skirt as indicated by reference numberal 32, may be provided.

Thus, the present invention serves to properly position studs on the stepped base metal, and to provide a preferred atmosphere of shield gas. Furthermore, flexibility of the welding operation is improved by rotatably mounting the welding guide on the holder.

I claim:

1. A stud welding device comprising a collet having a forward end portion with a tip adapted to hold a stud at the tip of the forward end portion thereof, a rotatable bearing assembly disposed about said forward end portion of said collet spaced from said tip, and a cylindrical welding guide disposed around said forward end portion of said collet and mounted on said bearing assembly for rotation about said collet, said welding guide having a cut-off adjacent its forward end to form a step in said guide, with an opening and an L-shaped cover plate disposed in said cut-off having one leg providing a surface adjacent to and substantially parallel with said collet to form a positioning surface and a second leg providing a surface normal to said positioning surface for covering the opening formed by said step.

2. A stud welding device as set forth in claim 1 wherein said collet is provided with a barrier of insulating material on its outer surface.

3. A stud welding device as set forth in claim 1 wherein said welding guide comprises a positioning surface disposed on the opposite side of said collet from said positioning surface formed by said cover plate and substantially parallel thereto, said second positioning surface extending beyond the forward end portion of said collet.

* * * * *